US012456416B2

(12) United States Patent
Tseng

(10) Patent No.: US 12,456,416 B2
(45) Date of Patent: Oct. 28, 2025

(54) PIXEL DRIVING CIRCUIT, DISPLAY PANEL AND DRIVING METHOD OF PIXEL DRIVING CIRCUIT

(71) Applicant: Everdisplay Optronics (Shanghai) Co., Ltd., Shanghai (CN)

(72) Inventor: Ying-Hsiang Tseng, Shanghai (CN)

(73) Assignee: Everdisplay Optronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/681,528

(22) PCT Filed: Feb. 23, 2023

(86) PCT No.: PCT/CN2023/077901
§ 371 (c)(1),
(2) Date: Feb. 6, 2024

(87) PCT Pub. No.: WO2024/124692
PCT Pub. Date: Jun. 20, 2024

(65) Prior Publication Data
US 2025/0131869 A1  Apr. 24, 2025

(30) Foreign Application Priority Data

Dec. 12, 2022  (CN) .......................... 202211606282.0

(51) Int. Cl.
*G09G 3/32*  (2016.01)
(52) U.S. Cl.
CPC ....... *G09G 3/32* (2013.01); *G09G 2320/0257* (2013.01)

(58) Field of Classification Search
CPC ............. G09G 3/32; G09G 2320/0257; G09G 3/3233; G09G 2300/0819;
(Continued)

(56) References Cited

U.S. PATENT DOCUMENTS

2018/0197458 A1* 7/2018 Xi ............................ G09G 3/30
2019/0164494 A1* 5/2019 Bae ....................... G09G 3/3258
(Continued)

FOREIGN PATENT DOCUMENTS

CN  107342044 A  11/2017
CN  107680537 A  2/2018
(Continued)

OTHER PUBLICATIONS

International Search Report Sep. 10, 2023 of International Application No. PCT/CN2023/077901.

*Primary Examiner* — Sujit Shah
(74) *Attorney, Agent, or Firm* — Qinghong Xu

(57) ABSTRACT

The present disclosure provides a pixel driving circuit, a display panel and a driving method of the pixel driving circuit. The pixel driving circuit includes a first transistor, a second transistor, a third transistor, a fourth transistor, a sixth transistor, a driving transistor, a first capacitor and a fifth transistor. A gate electrode of the fifth transistor is coupled to a third input terminal, the third input terminal is coupled to a third control signal lead, and the third control signal lead maintains a low level in both the triggering sub-stage and the maintaining sub-stage of the capacitor resetting stage. The present disclosure can reduce the hysteresis of the driving transistor and improve the afterimage phenomenon of a display screen.

17 Claims, 4 Drawing Sheets

(58) Field of Classification Search
CPC ... G09G 2300/0861; G09G 2300/0842; G09G 3/3266; G09G 2300/0426; G09G 2320/0233; G09G 2310/08; G09G 2310/0251; G09G 3/3258; G09G 2300/0852; G09G 2310/0262; G09G 2320/045; G09G 3/3291; G09G 2320/043; G09G 3/3225; G09G 2310/061; G09G 3/3275; G09G 2320/0247; G09G 2320/0295; G09G 2320/0238; G09G 2320/0626; G09G 3/325

See application file for complete search history.

(56) References Cited

U.S. PATENT DOCUMENTS

| | | | |
|---|---|---|---|
| 2019/0206320 A1 | 7/2019 | Nam et al. | |
| 2021/0366386 A1* | 11/2021 | Gao | G09G 3/3258 |

FOREIGN PATENT DOCUMENTS

| | | |
|---|---|---|
| CN | 110942743 A | 3/2020 |
| CN | 111354314 A | 6/2020 |

* cited by examiner

PIXEL DRIVING CIRCUIT, DISPLAY PANEL AND DRIVING METHOD OF PIXEL DRIVING CIRCUIT

CROSS-REFERENCE TO RELATED APPLICATION

The present disclosure is an US national phase of International Application No. PCT/CN2023/077901, filed on Feb. 23, 2023, which is based upon and claims priority to Chinese Patent Application No. 202211606282.0, filed Dec. 12, 2022, and the entire content of which is incorporated herein by reference.

TECHNICAL FIELD

The present disclosure relates to the field of a control circuit of a display panel, and in particular, to a pixel driving circuit, a display panel and a driving method of the pixel driving circuit.

BACKGROUND

In the process of displaying, the display panel may display various different pictures, and when switching between different pictures, there are varying degrees of bias voltage on the driving device of the display screen due to differences in picture, time and voltage, etc. of pixel points compared to the previous moment. In particular, for the commonly used TFT devices, the hysteresis phenomenon may occur after the bias voltage, which results in the afterimage phenomenon in the process of switching pictures, thereby affecting the user's experience.

FIG. 1 shows a circuit diagram of a pixel driving unit of a pixel driving circuit in the prior art. FIG. 2 shows a pulse waveform diagram corresponding to the circuit diagram of the pixel driving unit of the pixel driving circuit in the prior art.

As shown in FIG. 1 and FIG. 2, a control signal lead (En) simultaneously controls two transistors that are above and below the driving transistor respectively. The driving is mainly divided into three parts, where A is a capacitor resetting stage, B is a data writing stage, and C is a light emitting stage. Two triggering signals sent by a control signal lead (Sn) and a control signal lead (Sp) correspond to the time of the stage A and stage B, both of which are the time for the display panel to display one row. FIG. 3 is a Vgs-Ids diagram of a driving transistor in the prior art. As shown in FIG. 3, when the driving transistor in the prior art is switched from a white driving voltage to a gray driving voltage, the current may be firstly less than the current of displaying gray normally, and then gradually increase to approach the middle curve. Similarly, when switching from the black driving voltage to the gray driving voltage, the current may be firstly greater than the current of displaying gray normally, and then gradually decrease to approach the middle curve. Therefore, when the picture changes suddenly, the current of the driving transistor will not switch instantaneously, that is, the hysteresis will occur, resulting in the afterimage phenomenon in the picture switching process.

SUMMARY

With respect to defects existing in the related art, the present disclosure aims to provide a pixel driving circuit, a display panel and a driving method of the pixel driving circuit, which overcomes the difficulties in the related art, and adds a control signal lead, so that the hysteresis of a driving transistor can be reduced and the afterimage phenomenon of a display screen can be improved.

An embodiment of the present disclosure provides a pixel driving circuit, which includes a plurality of pixel driving units, the pixel driving unit including:
a first transistor, a first electrode of the first transistor being coupled to a fifth input terminal, a second electrode of the first transistor being coupled to a first node, and a gate electrode of the first transistor being coupled to a second input terminal;
a second transistor, a first electrode of the second transistor being coupled to a second node, a second electrode of the second transistor being coupled to a first power supply voltage, and a gate electrode of the second transistor being coupled to a first input terminal;
a third transistor, a first electrode of the third transistor being coupled to the second node, a second electrode of the third transistor being coupled to a third node, and a gate electrode of the third transistor being coupled to the second input terminal;
a fourth transistor, a first electrode of the fourth transistor being coupled to the first power supply voltage, a second electrode of the fourth transistor being coupled to a fourth node, and a gate electrode of the fourth transistor being coupled to a sixth input terminal;
a sixth transistor, a first electrode of the sixth transistor being coupled to the third node, a second electrode of the sixth transistor being coupled to the fourth node, and a gate electrode of the sixth transistor being coupled to a fourth input terminal;
a driving transistor, a first electrode of the driving transistor being coupled to the first node, a second electrode of the driving transistor being coupled to the third node, and a gate electrode of the driving transistor being coupled to the second node;
a first capacitor, a first electrode of the first capacitor being coupled to a second power supply voltage, and a second electrode of the first capacitor being coupled to the second node; and
a fifth transistor, a first electrode of the fifth transistor being coupled to the second power supply voltage, a second electrode of the fifth transistor being coupled to the first node, and a gate electrode of the fifth transistor being coupled to a third input terminal;
the third input terminal being coupled to a third control signal lead, and maintaining a low level in both a triggering sub-stage and a maintaining sub-stage of a capacitor resetting stage.

In some embodiments, the third control signal lead jumps to a high level before a data writing stage following the capacitor resetting stage and jumps to the low level during a light emitting stage after the data writing stage.

In some embodiments, the pixel driving unit further includes a light emitting diode, an anode of which is coupled to the fourth node, and a cathode of which is coupled to a third power supply voltage.

In some embodiments, each of the first transistor, the second transistor, the third transistor, the fourth transistor, the fifth transistor, the sixth transistor and the driving transistor of the pixel driving unit is a P-type MOS transistor.

In some embodiments, the pixel driving circuit further includes a first control signal lead and a second control signal lead;
a first triggering signal is inputted via the first control signal lead in the triggering sub-stage of the capacitor resetting stage, and the first control signal lead is maintained at the high level in the maintaining sub-stage, the data writing stage and the light emitting stage; and the second control signal lead is maintained at the high level in the capacitor resetting stage, a second triggering signal is inputted via the second control signal lead in the data writing stage, and the second control signal lead is maintained at the high level in the light emitting stage.

In some embodiments, the pixel driving circuit further includes a fourth control signal lead. A rising edge signal is inputted via the fourth control signal lead before the capacitor resetting stage, the fourth control signal lead is maintained at the high level in the data writing stage, and a falling edge signal is inputted via the fourth control signal lead after the data writing stage.

In some embodiments, the pixel driving circuit further includes a data signal lead, and a data voltage is written in the data writing stage via the data signal lead.

An embodiment of the present disclosure also provides a display panel, which includes the above pixel driving circuit.

An embodiment of the present disclosure also provides a driving method of a pixel driving circuit, which is used for driving the pixel driving unit of the above pixel driving circuit. The driving method includes:

the capacitor resetting stage including a triggering sub-stage and a maintaining sub-stage following the triggering sub-stage; in the triggering sub-stage, inputting a first triggering signal via a first control signal lead of the pixel driving circuit, maintaining a second control signal lead of the pixel driving circuit at a high level, and maintaining a third control signal lead of the pixel driving circuit at a low level; in the maintaining sub-stage, maintaining the first control signal lead at the high level, maintaining the second control signal lead at the high level, and maintaining the third control signal lead at the low level;

in a data writing stage after the capacitor resetting stage, maintaining the first control signal lead at the high level, inputting a second triggering signal via the second control signal lead, and before the data writing stage, inputting a rising edge signal via the third control signal lead; and in the light emitting stage after the data writing stage, maintaining the first control signal lead at the high level, maintaining the second control signal lead at the high level, and during the light emitting stage, inputting a falling edge signal via the third control signal lead.

According to the pixel driving circuit, the display panel and the driving method of the pixel driving circuit in the present disclosure, a control signal lead is added, so that the hysteresis of the driving transistor can be reduced and the afterimage phenomenon of the display screen can be improved.

BRIEF DESCRIPTION OF THE DRAWINGS

Other features, objects and advantages of the present disclosure will become more apparent by reading the detailed description of non-limiting embodiments with reference to the following accompanying drawings.

REFERENCE SIGNS

Figure 1:
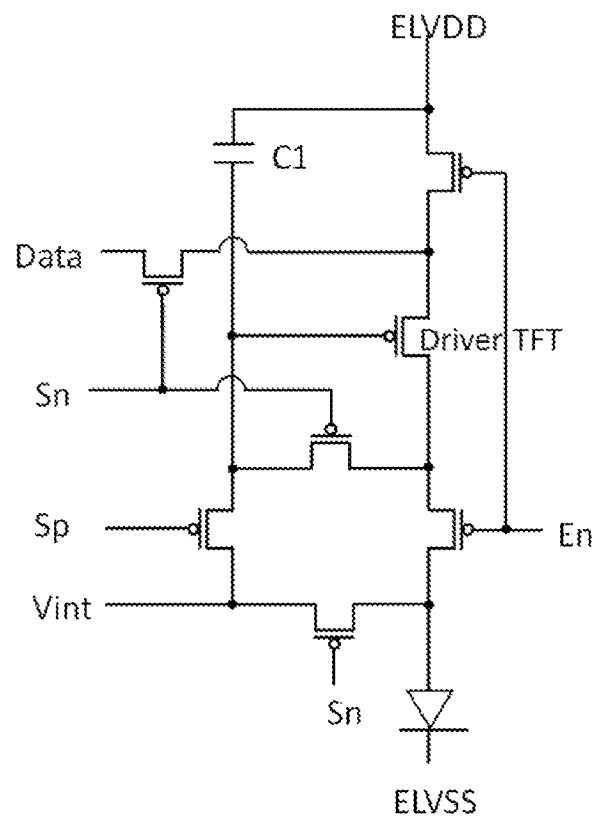
FIG. 1 is a circuit diagram of a pixel driving unit of a pixel driving circuit in the prior art.
Figure 2:
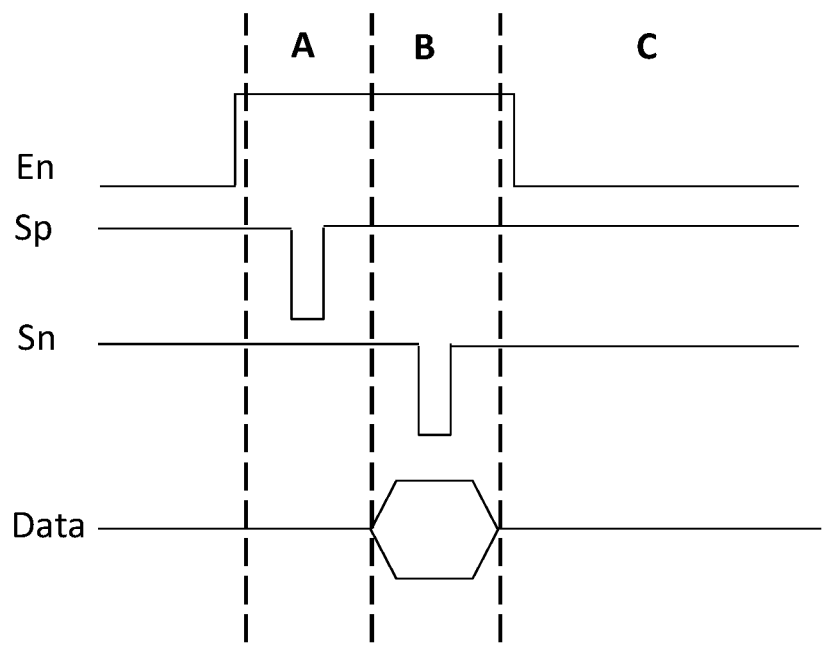
FIG. 2 is a pulse waveform diagram corresponding to the circuit diagram of the pixel driving unit of the pixel driving circuit in the prior art.
Figure 3:
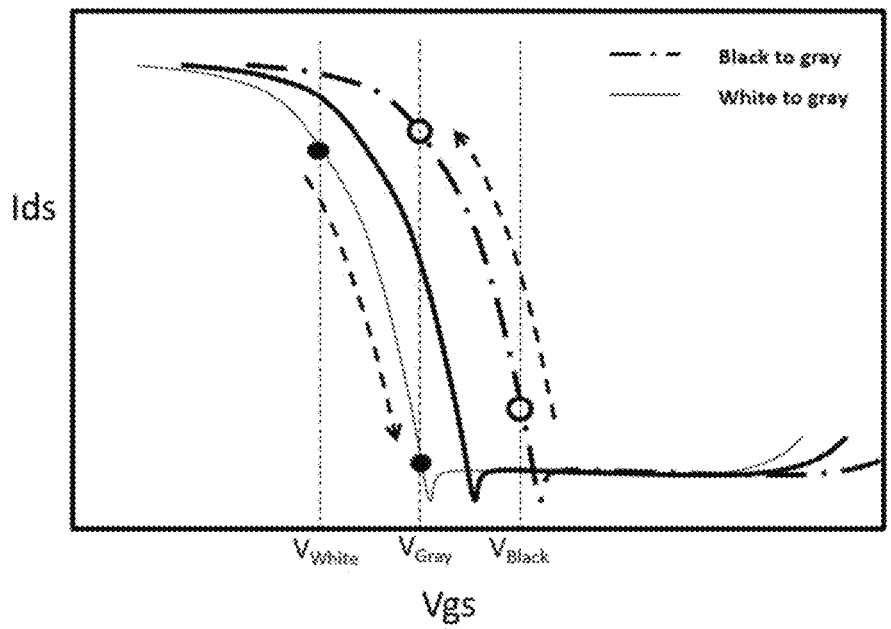
FIG. 3 is a Vgs-Ids diagram of a driving transistor in the prior art.

T1 First transistor
T2 Second transistor
T3 Third transistor
T4 Fourth transistor
T5 Fifth transistor
T6 Sixth transistor
T7 Driving transistor
C1 First capacitance
N1 First node
N2 Second node
N3 Third node
N4 Fourth node
IN1 First input terminal
IN2 Second input terminal
IN3 Third input terminal
IN4 Fourth input terminal
IN5 Fifth input terminal
IN6 Sixth input terminal
Vint First power supply voltage
ELVDD Second power supply voltage
ELVSS Third power supply voltage
Sp First control signal lead
Sn Second control signal lead
Ep Third control signal lead
En Fourth control signal lead
Data Data signal lead

DETAILED DESCRIPTION

The following embodiments of the present disclosure are illustrated through specific examples with reference to the accompanying drawings, and those skilled in the art may easily understand other advantages and benefits of the present disclosure from the contents disclosed herein. The present disclosure may also be implemented or applied in different specific embodiments, and various details in the present disclosure may be modified or changed according to different viewpoints and application systems without departing from the spirit of the present disclosure. It should be noted that the embodiments in the present disclosure and the features in the embodiments may be combined with each other if there is no conflict.

In the representation of the present disclosure, the representations of the reference terms "one embodiment", "some embodiments", "example", "specific example", "some examples" or the like mean that the specific features, structures, materials or characteristics represented in combination with this embodiment or example are included in at least one embodiment or example of the present disclosure. Moreover, the specific features, structures, materials or characteristics represented may be combined in any one or more embodiments or examples in a suitable manner. In addition, those skilled in the art may combine and integrate different embodiments or examples and features of the different embodiments or examples represented in the present disclosure without contradicting each other.

In order to clearly illustrate the present application, devices that are not relevant to the description are omitted, and the same or similar constituent elements throughout the specification are given the same reference symbols.

Throughout the specification, when a device is said to be "connected" to another device, this includes not only the case of a "direct connection", but also the case of an "indirect connection" in which other element is placed between them.

When a device is said to be "on" another device, it may be directly on another device, or other device may be located therebetween. When a device is said to be "directly" on another device, there is no other device between them.

Although the terms "first", "second" and the like are used herein in some examples to represent various elements, these elements should not be limited by these terms and should not be understood as indicating or implying relative importance or implicitly indicating the number of indicated technical features. Therefore, the features defined with "first" and "second" may explicitly or implicitly include at least one of such feature. These terms are only used to distinguish one element from another, for example, the representations of the first interface and the second interface. Furthermore, as used herein, the singular forms "a/an", "one" and "the" are intended to also include the plural forms, unless the context indicates to the contrary. In the representation of the present disclosure, "a plurality of" means two or more, unless otherwise specifically defined. It should be further understood that the terms "including" and "containing" indicate the presence of features, steps, operations, elements, components, items, categories and/or groups, but do not exclude the presence, appearance or addition of one or more other features, steps, operations, elements, components, items, categories and/or groups. The terms "or" and "and/or" as used herein are to be interpreted as inclusive or mean any one or any combination. Therefore, "A, B or C" or "A, B and/or C" means "any of the following: A; B; C; A and B; A and C; B and C; A, B and C". An exception to this definition occurs only when a combination of elements, functions, steps or operations are inherently mutually exclusive in some way.

The technical terms used herein are only used to refer to specific embodiments and are not intended to limit the present application. The singular forms used herein include the plural forms as long as the sentence does not clearly indicate the opposite meaning.

Although not defined differently, all terms, including the technical terms and the scientific terms used herein, have the same meaning as commonly understood by those skilled in the art to which the present application belongs. The terms defined in commonly used dictionaries are additionally interpreted as having meanings consistent with the contents of the relevant technical documents and the current tips. As long as they are not defined, the terms shall not be excessively interpreted as ideal or very formulaic meanings.

Figure 4:
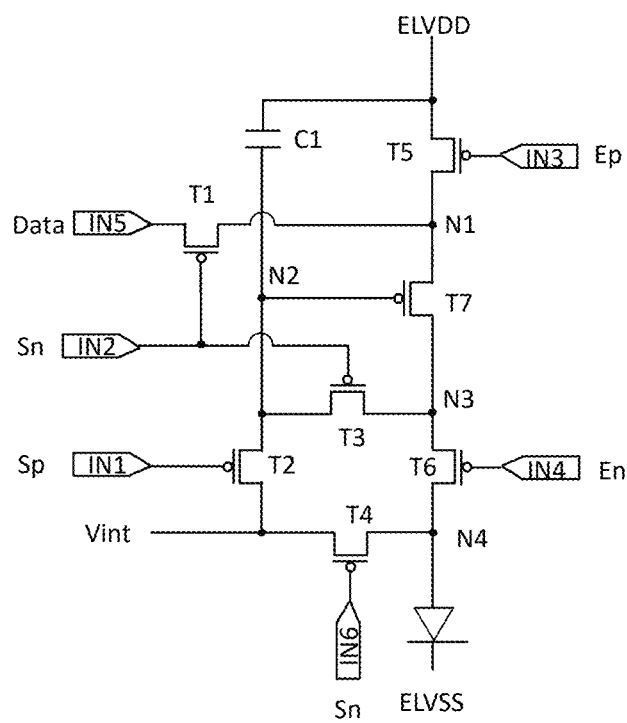
FIG. 4 is a circuit diagram of a pixel driving unit circuit of the present disclosure.

FIG. 4 is a circuit diagram of a pixel driving unit circuit of the present disclosure. As shown in FIG. 4, a pixel driving circuit of the present disclosure is characterized by including a plurality of pixel driving units, the pixel driving unit including a first transistor T1, a second transistor T2, a third transistor T3, a fourth transistor T4, a sixth transistor T6, a driving transistor T7, a first capacitor C1 and a fifth transistor T5. A first electrode of the first transistor T1 is coupled to a fifth input terminal IN5, a second electrode of the first transistor is coupled to a first node N1, and a gate electrode of the first transistor is coupled to a second input terminal IN2. A first electrode of the second transistor T2 is coupled to a second node N2, a second electrode of the second transistor is coupled to a first power supply voltage Vint, and a gate electrode of the second transistor is coupled to a first input terminal IN1. A first electrode of the third transistor T3 is coupled to the second node N2, a second electrode of the third transistor is coupled to a third node N3, and a gate electrode of the third transistor is coupled to the second input terminal IN2. A first electrode of the fourth transistor T4 is coupled to the first power supply voltage Vint, a second electrode of the fourth transistor is coupled to a fourth node N4, and a gate electrode of the fourth transistor is coupled to a sixth input terminal IN6. A first electrode of the sixth transistor T6 is coupled to the third node N3, a second electrode of the sixth transistor is coupled to the fourth node N4, and a gate electrode of the sixth transistor is coupled to a fourth input terminal IN4. A first electrode of the driving transistor T7 is coupled to the first node N1, a second electrode of the driving transistor is coupled to the third node N3, and a gate electrode of the driving transistor is coupled to the second node N2. A first electrode of the first capacitor C1 is coupled to a second power supply voltage ELVDD, and a second electrode of the first capacitor is coupled to the second node N2. A first electrode of the fifth transistor T5 is coupled to the second power supply voltage ELVDD, a second electrode of the fifth transistor is coupled to the first node N1, and a gate electrode of the fifth transistor is coupled to a third input terminal IN3. The third input terminal IN3 is coupled to a third control signal lead Ep, and is maintained at a low level in both a triggering sub-stage A1 and a maintaining sub-stage A2 of the capacitor resetting stage A. In the present disclosure, compared with the related art, the third control signal lead Ep is added in the pixel driving circuit, so that the threshold voltage of the driving transistor is forcibly biased to a specific value during the capacitor resetting stage. Furthermore, the maintaining sub-stage A2 is added in the capacitor resetting stage compared with the related art, so that the driving transistors of the pixels of the display panel all have the same threshold voltage before data is written, which can reduce the hysteresis of the driving transistors and improve the afterimage phenomenon of the display screen.

In a preferred embodiment, the third control signal lead Ep jumps to a high level before the data writing stage B following the capacitor resetting stage A, and jumps to the low level during a light emitting stage C after the data writing stage B, but not limited thereto.

In a preferred embodiment, the pixel driving unit further includes a light emitting diode, an anode of which is coupled to the fourth node N4, and a cathode of which is coupled to a third power supply voltage ELVSS, but not limited thereto.

In a preferred embodiment, each of the first transistor T1, the second transistor T2, the third transistor T3, the fourth transistor T4, the fifth transistor T5, the sixth transistor T6 and the driving transistor T7 of the pixel driving unit is a P-type MOS transistor, but not limited to thereto.

In a preferred embodiment, the pixel driving circuit further includes a first control signal lead Sp and a second control signal lead Sn. A first triggering signal is inputted via the first control signal lead Sp in the triggering sub-stage A1 of the capacitor resetting stage A, and the first control signal lead is maintained at the high level in the maintaining sub-stage A2, the data writing stage B and the light emitting stage C. The second control signal lead Sn is maintained at the high level in the capacitor resetting stage A, a second triggering signal is inputted via the second control signal lead in the data writing stage B, and the second control signal lead is maintained at the high level in the light emitting stage C, but not limited thereto.

In a preferred embodiment, the pixel driving circuit further includes a fourth control signal lead En. A rising edge signal is inputted via the fourth control signal lead before the capacitor resetting stage A, the fourth control signal lead is maintained at the high level during the data writing stage B, and a falling edge signal is inputted via the fourth control signal lead after the data writing stage B, but not limited thereto.

In a preferred embodiment, the pixel driving circuit further includes a data signal lead Data, and the data signal lead Data writes a data voltage in the data writing stage B, but not limited thereto.

Figure 5:
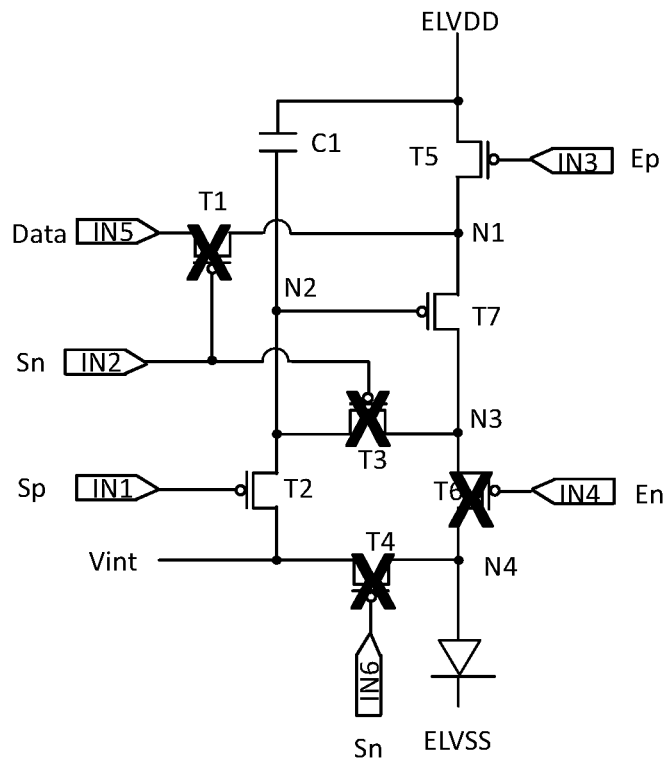
FIG. 5 is a schematic diagram of a conducting state of the pixel driving unit circuit in a stage A in FIG. 4.
Figure 6:
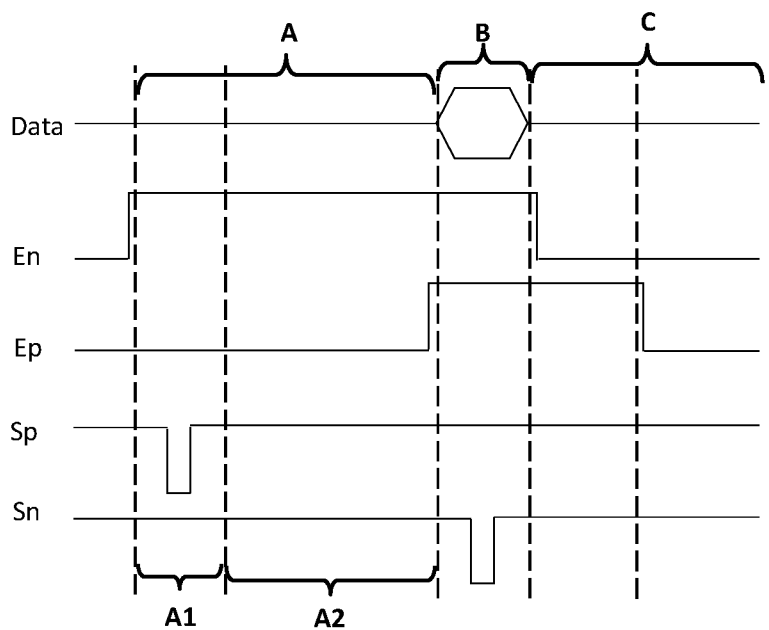
FIG. 6 is a pulse waveform diagram corresponding to the circuit diagram of the pixel driving unit circuit of the present disclosure.

In the following, the specific circuit conducting condition of the pixel driving unit circuit of the present disclosure in the stage A and the corresponding pulse waveform diagram are shown through FIGS. 5 to 6. FIG. 5 is a schematic diagram of a conducting state of the pixel driving unit circuit in the stage A in FIG. 4. FIG. 6 is a pulse waveform diagram corresponding to the circuit diagram of the pixel driving unit circuit of the present disclosure. "×" is used in FIG. 6 to indicate that the transistor is cut off.

As shown in FIGS. 5 and 6, the pixel driving unit of the present disclosure has the following three stages: a capacitor resetting stage A, including a triggering sub-stage A1 and a maintaining sub-stage A2 following the triggering sub-stage A1, a data writing stage B after the capacitor resetting stage A and a light emitting stage C after the data writing stage B.

In the triggering sub-stage A1 of the capacitor resetting stage A, a first triggering signal is inputted via a first control signal lead Sp, a second control signal lead Sn is maintained at a high level, a third control signal lead Ep is maintained at a low level, and a rising edge signal is inputted via a fourth control signal lead En before the triggering sub-stage A1. In the maintaining sub-stage A2, the first control signal lead Sp is maintained at the high level, the second control signal lead Sn is maintained at the high level, the third control signal lead Ep is maintained at the low level, and the fourth control signal lead En is maintained at the high level.

The second transistor T2, the fifth transistor T5 and the driving transistor T7 are turned on, and the first transistor T1, the third transistor T3, the fourth transistor T4 and the sixth transistor T6 are turned off.

Finally, the threshold voltage Vgs of the driving transistor is set at a specific value, that is, Vgs is equal to the difference between the first power supply voltage Vint and the second power supply voltage ELVDD. The duration of the triggering sub-stage A1 is the duration of the capacitor resetting stage in the related art, that is, the duration of the display panel displaying one row of pixels, and the duration of the maintaining sub-stage A2 is 1 to 49 times the duration of the triggering sub-stage A1.

In the data writing stage B, the first control signal lead Sp is maintained at the high level, a second triggering signal is inputted via the second control signal lead Sn, and before the data writing stage B, a rising edge signal is inputted via the third control signal lead Ep, and the fourth control signal lead En is maintained at the high level. At this stage, a driving voltage is written to the driving transistor via the data signal lead Data.

In the light emitting stage C, the first control signal lead Sp is maintained at the high level, and the second control signal lead Sn is maintained at the high level. During the light emitting stage C, a falling edge signal is inputted via the third control signal lead Ep, and the falling edge signal is inputted via the fourth control signal lead En in the data writing stage B and the fourth control signal lead is maintained at the low level in the light emitting stage C. At this stage, the driving transistor drives the light emitting diode to emit light according to the driving voltage.

Figure 7:
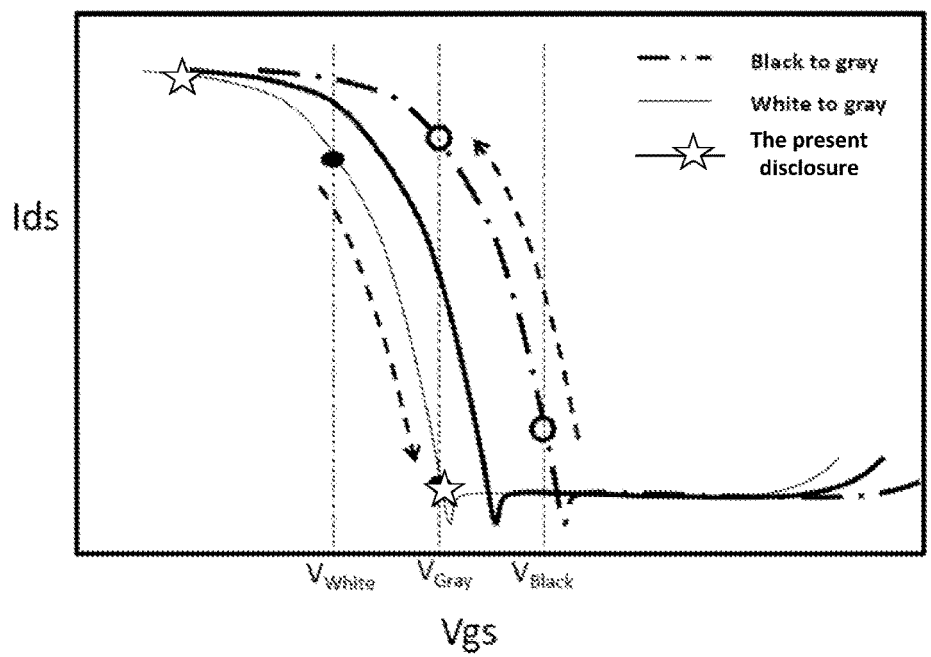
FIG. 7 is a Vgs-Ids diagram of the driving transistor of the present disclosure and the driving transistor of the prior art.
Figure 8:
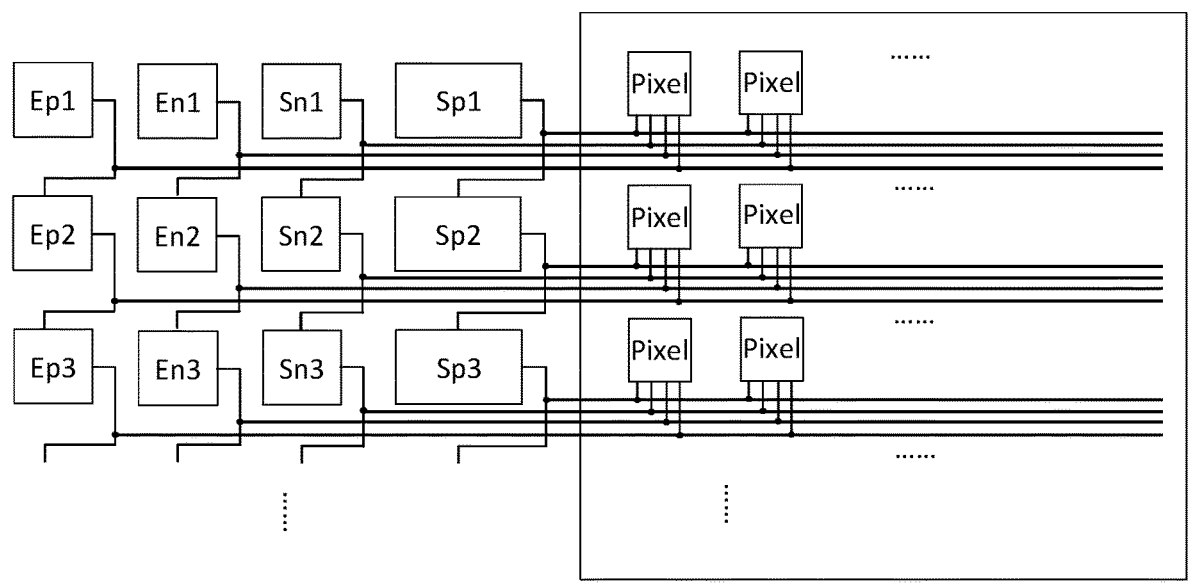
FIG. 8 is a circuit diagram of the pixel driving circuit of the present disclosure.

FIG. 7 is a Vgs-Ids diagram of the driving transistor of the present disclosure and the driving transistor of the related art. FIG. 8 is a circuit diagram of the pixel driving circuit of the present disclosure. As shown in FIG. 7 and FIG. 8, before writing the driving voltage, the driving transistor of the pixel driving unit of the present disclosure is firstly forcibly biased to a threshold voltage value for displaying white pixels, and the threshold voltage Vgs will maintain this voltage value in the whole maintaining sub-stage A2, and then the driving voltage is written in the data writing stage B. Therefore, the Vgs-Ids diagram of the driving transistor of the present disclosure contains only one curve, which coincides with the curve of the driving transistor in the related art when switching from the white driving voltage to the gray driving voltage. Thus, the pixel driving circuit of the present disclosure enables the driving transistors of all pixels of the display panel to have the same threshold voltage and maintain it for a period of time before writing data, which can reduce the hysteresis of the driving transistors and improve the afterimage phenomenon of the display screen.

To sum up, according to the pixel driving circuit, the display panel and the driving method of the pixel driving circuit of the present disclosure, a control signal lead is added, so that the hysteresis of a driving transistor can be reduced and the afterimage phenomenon of a display screen can be improved.

Specific embodiments of the present disclosure have been described as above. It should be appreciated that the present disclosure is not limited to the above specific embodiments, and those skilled in the art can make various variations or modifications within the scope of the claims, which does not affect the essential contents of the present disclosure.

What is claimed is:

1. A pixel driving circuit, comprising a plurality of pixel driving units, wherein the pixel driving unit comprises:
    a first transistor, a first electrode of the first transistor being coupled to a fifth input terminal, a second electrode of the first transistor being coupled to a first node, and a gate electrode of the first transistor being coupled to a second input terminal;
    a second transistor, a first electrode of the second transistor being coupled to a second node, a second electrode of the second transistor being coupled to a first power supply voltage, and a gate electrode of the second transistor being coupled to a first input terminal;
    a third transistor, a first electrode of the third transistor being coupled to the second node, a second electrode of the third transistor being coupled to a third node, and a gate electrode of the third transistor being coupled to the second input terminal;
    a fourth transistor, a first electrode of the fourth transistor being coupled to the first power supply voltage, a second electrode of the fourth transistor being coupled to a fourth node, and a gate electrode of the fourth transistor being coupled to a sixth input terminal;

a sixth transistor, a first electrode of the sixth transistor being coupled to the third node, a second electrode of the sixth transistor being coupled to the fourth node, and a gate electrode of the sixth transistor being coupled to a fourth input terminal;

a driving transistor, a first electrode of the driving transistor being coupled to the first node, a second electrode of the driving transistor being coupled to the third node, and a gate electrode of the driving transistor being coupled to the second node;

a first capacitor, a first electrode of the first capacitor being coupled to a second power supply voltage, and a second electrode of the first capacitor being coupled to the second node; and a fifth transistor, a first electrode of the fifth transistor being coupled to the second power supply voltage, a second electrode of the fifth transistor being coupled to the first node, and a gate electrode of the fifth transistor being coupled to a third input terminal;

wherein the third input terminal is coupled to a third control signal lead, and is maintained at a low level in both a triggering sub-stage and a maintaining sub-stage of a capacitor resetting stage, wherein the third control signal lead jumps to a high level before a data writing stage following the capacitor resetting stage and jumps to the low level during a light emitting stage after the data writing stage.

2. The pixel driving circuit according to claim 1, wherein the pixel driving unit further comprises a light emitting diode, an anode of the light emitting diode is coupled to the fourth node, and a cathode of the light emitting diode is coupled to a third power supply voltage.

3. The pixel driving circuit according to claim 1, wherein each of the first transistor, the second transistor, the third transistor, the fourth transistor, the fifth transistor, the sixth transistor and the driving transistor of the pixel driving unit is a P-type MOS transistor.

4. The pixel driving circuit according to claim 1, wherein the pixel driving circuit further comprises a first control signal lead and a second control signal lead;

a first triggering signal is inputted via the first control signal lead in the triggering sub-stage of the capacitor resetting stage, and the first control signal lead is maintained at the high level in the maintaining sub-stage, the data writing stage and the light emitting stage; and the second control signal lead is maintained at the high level in the capacitor resetting stage, a second triggering signal is inputted via the second control signal lead in the data writing stage, and the second control signal lead is maintained at the high level in the light emitting stage.

5. The pixel driving circuit according to claim 1, wherein the pixel driving circuit further comprises a fourth control signal lead, and a rising edge signal is inputted via the fourth control signal lead before the capacitor resetting stage, the fourth control signal lead is maintained at the high level in the data writing stage, and a falling edge signal is inputted via the fourth control signal lead after the data writing stage.

6. The pixel driving circuit according to claim 1, wherein the pixel driving circuit further comprises a data signal lead, and a data voltage is written in the data writing stage via the data signal lead.

7. A display panel, comprising a pixel driving circuit, wherein the pixel driving circuit comprises a plurality of pixel driving units, wherein the pixel driving unit comprises:

a first transistor, a first electrode of the first transistor being coupled to a fifth input terminal, a second electrode of the first transistor being coupled to a first node, and a gate electrode of the first transistor being coupled to a second input terminal;

a second transistor, a first electrode of the second transistor being coupled to a second node, a second electrode of the second transistor being coupled to a first power supply voltage, and a gate electrode of the second transistor being coupled to a first input terminal;

a third transistor, a first electrode of the third transistor being coupled to the second node, a second electrode of the third transistor being coupled to a third node, and a gate electrode of the third transistor being coupled to the second input terminal;

a fourth transistor, a first electrode of the fourth transistor being coupled to the first power supply voltage, a second electrode of the fourth transistor being coupled to a fourth node, and a gate electrode of the fourth transistor being coupled to a sixth input terminal;

a sixth transistor, a first electrode of the sixth transistor being coupled to the third node, a second electrode of the sixth transistor being coupled to the fourth node, and a gate electrode of the sixth transistor being coupled to a fourth input terminal;

a driving transistor, a first electrode of the driving transistor being coupled to the first node, a second electrode of the driving transistor being coupled to the third node, and a gate electrode of the driving transistor being coupled to the second node;

a first capacitor, a first electrode of the first capacitor being coupled to a second power supply voltage, and a second electrode of the first capacitor being coupled to the second node; and a fifth transistor, a first electrode of the fifth transistor being coupled to the second power supply voltage, a second electrode of the fifth transistor being coupled to the first node, and a gate electrode of the fifth transistor being coupled to a third input terminal;

wherein the third input terminal is coupled to a third control signal lead, and is maintained at a low level in both a triggering sub-stage and a maintaining sub-stage of a capacitor resetting stage, wherein the third control signal lead jumps to a high level before a data writing stage following the capacitor resetting stage and jumps to the low level during a light emitting stage after the data writing stage.

8. The display panel according to claim 7, wherein the pixel driving unit further comprises a light emitting diode, an anode of the light emitting diode is coupled to the fourth node, and a cathode of the light emitting diode is coupled to a third power supply voltage.

9. The display panel according to claim 7, wherein each of the first transistor, the second transistor, the third transistor, the fourth transistor, the fifth transistor, the sixth transistor and the driving transistor of the pixel driving unit is a P-type MOS transistor.

10. The display panel according to claim 7, wherein the pixel driving circuit further comprises a first control signal lead and a second control signal lead;

a first triggering signal is inputted via the first control signal lead in the triggering sub-stage of the capacitor resetting stage, and the first control signal lead is maintained at the high level in the maintaining sub-stage, the data writing stage and the light emitting stage; and the second control signal lead is maintained at the high level in the capacitor resetting stage, a second triggering signal is inputted via the second control signal lead in the data writing stage, and the second control signal lead is maintained at the high level in the light emitting stage.

11. The display panel according to claim 7, wherein the pixel driving circuit further comprises a fourth control signal lead, and a rising edge signal is inputted via the fourth control signal lead before the capacitor resetting stage, the fourth control signal lead is maintained at the high level in the data writing stage, and a falling edge signal is inputted via the fourth control signal lead after the data writing stage.

12. The display panel according to claim 7, wherein the pixel driving circuit further comprises a data signal lead, and a data voltage is written in the data writing stage via the data signal lead.

13. A driving method of a pixel driving circuit, for driving a pixel driving unit of the pixel driving circuit, wherein the pixel driving unit comprises: a first transistor, a first electrode of the first transistor being coupled to a fifth input terminal, a second electrode of the first transistor being coupled to a first node, and a gate electrode of the first transistor being coupled to a second input terminal; a second transistor, a first electrode of the second transistor being coupled to a second node, a second electrode of the second transistor being coupled to a first power supply voltage, and a gate electrode of the second transistor being coupled to a first input terminal; a third transistor, a first electrode of the third transistor being coupled to the second node, a second electrode of the third transistor being coupled to a third node, and a gate electrode of the third transistor being coupled to the second input terminal; a fourth transistor, a first electrode of the fourth transistor being coupled to the first power supply voltage, a second electrode of the fourth transistor being coupled to a fourth node, and a gate electrode of the fourth transistor being coupled to a sixth input terminal; a sixth transistor, a first electrode of the sixth transistor being coupled to the third node, a second electrode of the sixth transistor being coupled to the fourth node, and a gate electrode of the sixth transistor being coupled to a fourth input terminal; a driving transistor, a first electrode of the driving transistor being coupled to the first node, a second electrode of the driving transistor being coupled to the third node, and a gate electrode of the driving transistor being coupled to the second node; a first capacitor, a first electrode of the first capacitor being coupled to a second power supply voltage, and a second electrode of the first capacitor being coupled to the second node; and a fifth transistor, a first electrode of the fifth transistor being coupled to the second power supply voltage, a second electrode of the fifth transistor being coupled to the first node, and a gate electrode of the fifth transistor being coupled to a third input terminal; wherein the third input terminal is coupled to a third control signal lead, and is maintained at a low level in both a triggering sub-stage and a maintaining sub-stage of a capacitor resetting stage;

wherein the driving method comprises: the capacitor resetting stage comprising the triggering sub-stage and the maintaining sub-stage following the triggering sub-stage; in the triggering sub-stage, inputting a first triggering signal via a first control signal lead of the pixel driving circuit, maintaining a second control signal lead of the pixel driving circuit at a high level, and maintaining the third control signal lead of the pixel driving circuit at the low level; in the maintaining sub-stage, maintaining the first control signal lead at the high level, maintaining the second control signal lead at the high level, and maintaining the third control signal lead at the low level; in a data writing stage after the capacitor resetting stage, maintaining the first control signal lead at the high level, inputting a second triggering signal via the second control signal lead, and before the data writing stage, inputting a rising edge signal via the third control signal lead; in the light emitting stage after the data writing stage, maintaining the first control signal lead at the high level, maintaining the second control signal lead at the high level, and during the light emitting stage, inputting a falling edge signal via the third control signal lead, wherein the third control signal lead jumps to the high level before the data writing stage following the capacitor resetting stage and jumps to the low level during the light emitting stage after the data writing stage.

14. The driving method of the pixel driving circuit according to claim 13, wherein a duration of the maintaining sub-stage is 1 to 49 times a duration of the triggering sub-stage.

15. The driving method of the pixel driving circuit according to claim 13, wherein the pixel driving unit further comprises a light emitting diode, an anode of the light emitting diode is coupled to the fourth node, and a cathode of the light emitting diode is coupled to a third power supply voltage.

16. The driving method of the pixel driving circuit according to claim 13, wherein each of the first transistor, the second transistor, the third transistor, the fourth transistor, the fifth transistor, the sixth transistor and the driving transistor of the pixel driving unit is a P-type MOS transistor.

17. The driving method of the pixel driving circuit according to claim 13, wherein the pixel driving circuit further comprises a fourth control signal lead, and a rising edge signal is inputted via the fourth control signal lead before the capacitor resetting stage, the fourth control signal lead is maintained at the high level in the data writing stage, and a falling edge signal is inputted via the fourth control signal lead after the data writing stage.

* * * * *